United States Patent [19]
Poppe

[11] Patent Number: 5,483,776
[45] Date of Patent: Jan. 16, 1996

[54] UTILITY FLOOR CONSTRUCTION

[75] Inventor: Robert P. Poppe, Grand Rapids, Mich.

[73] Assignee: Steelcase, Inc., Grand Rapids, Mich.

[21] Appl. No.: 63,500

[22] Filed: May 18, 1993

[51] Int. Cl.$^6$ ................................ E04B 5/48; H02G 3/26
[52] U.S. Cl. .................... 52/220.3; 52/220.5; 52/126.6; 52/263; 174/48
[58] Field of Search ................................ 52/126.6, 220.3, 52/220.4, 220.5, 263; 174/48, 49, 96

[56] References Cited

U.S. PATENT DOCUMENTS

| | | | |
|---|---|---|---|
| 922,368 | 5/1909 | Wachel et al. | 52/220.5 |
| 3,924,370 | 12/1975 | Cauceglia et al. | |
| 4,250,674 | 2/1981 | Feist | 52/220.3 |
| 4,296,574 | 10/1981 | Stephens | |
| 4,338,484 | 7/1982 | Littrell | |
| 4,596,095 | 6/1986 | Chalfant | |
| 4,631,879 | 12/1986 | Kobayashi et al. | 52/220.3 |
| 4,676,036 | 6/1987 | Bessert | |
| 4,682,456 | 7/1987 | Hartman et al. | 52/220.4 |
| 4,773,196 | 9/1988 | Yoshida et al. | |
| 4,780,571 | 10/1988 | Huang | |
| 4,850,162 | 7/1989 | Albrecht | |
| 4,850,163 | 7/1989 | Kobayashi et al. | 52/220.3 |
| 4,883,503 | 11/1989 | Fish | |
| 4,984,408 | 1/1991 | Habraken et al. | |
| 5,009,383 | 4/1991 | Chapman | 52/220.6 |
| 5,031,369 | 7/1991 | Kobayashi et al. | 52/263 |
| 5,052,157 | 10/1991 | Ducroux et al. | |
| 5,057,647 | 10/1991 | Bogden et al. | |
| 5,263,289 | 11/1993 | Boyd | 52/220.5 |

FOREIGN PATENT DOCUMENTS

| | | | |
|---|---|---|---|
| 2487407 | 1/1982 | France | 52/220.3 |
| 3107060 | 5/1991 | Japan | 52/220.3 |
| 4031552 | 2/1992 | Japan | 52/220.3 |
| 4080462 | 3/1992 | Japan | 52/220.3 |
| WO8804713 | 6/1988 | WIPO | |

OTHER PUBLICATIONS

Exhibit A is a brochure published about Mar. 1987 by Kyodo Electric Co., of Japan, disclosing a raised floor adapted for receiving cabling.
Exhibit B is a brochure, publication date unknown, published by Officeflor of Charlotte, N.C., disclosing a raised floor adapted for receiving cabling thereunder.
Exhibit C is a brochure, publication date unknown, published by Co Design of Atlanta, Ga., disclosing a raised floor adapted for receiving cabling.
Exhibit D is a brochure, publication date unknown, published by Co Design of Atlanta, Ga., disclosing a raised floor adapted for receiving cabling.
Exhibit E is a brochure published Nov. 1990 by Co Design of Atlanta, Ga., disclosing a raised floor adapted for receiving cabling.
Exhibit F is a brochure, publication date unknown, published by Co Design of Atlanta, Ga., disclosing a raised floor adapted for receiving cabling.

*Primary Examiner*—Carl D. Friedman
*Assistant Examiner*—Winnie S. Yip
*Attorney, Agent, or Firm*—Price, Heneveld, Cooper, DeWitt & Litton

[57] ABSTRACT

A utility floor construction is provided including a plurality of interconnectable base tiles supported on a floor surface, each of which has upstanding pedestals. A plurality of floor tiles are supported on and attached to the pedestals to create a cavity thereunder. A plurality of differently shaped separator channels are positionable in the cavity and attachable to create a raceway, the separator channels being configured to segregate and shield wires, etc. from other utilities.

39 Claims, 9 Drawing Sheets

UTILITY FLOOR CONSTRUCTION

CROSS-REFERENCES TO RELATED APPLICATIONS

The present application is related to commonly assigned, co-pending U.S. patent application Ser. No. 08/063,463, filed May 18, 1993, entitled Utility Distribution System For Open Office Plans And The Like, which is hereby incorporated by reference.

BACKGROUND OF THE INVENTION

The present invention relates to the distribution of utilities in open office plans and the like, and in particular to a utility floor construction.

Modern offices are becoming increasingly complicated and sophisticated due largely to the ever increasing needs of the users for improved utilities support at each workstation, such as communications, computers and other types of date processors, electronic displays, etc., including physical accommodations, such as lighting, HVAC, security, and the like. For example, modern offices for highly skilled "knowledge workers" such as engineers, accountants, stock brokers, computer programmers, etc., are typically provided with multiple pieces of very specialized computer and communications equipment that are capable of processing information from numerous local and remote data resources to assist in solving incredibly complex problems. Such equipment has very stringent power and signal requirements, and must quickly and efficiently interface with related equipment at both adjacent and remote locations. Work areas with readily controllable lighting, HVAC, sound masking, and other physical support systems, are also highly desirable to maximize worker creativity and productivity. Many other types of high technology equipment and facilities are also presently being developed which will find their place in the workplaces of the future.

One important consequence of the advent of sophisticated electronic offices is the increased need and desirability for distributing utilities throughout the various offices in a manner which can be readily reconfigured. The term "utilities" as used herein incorporates a wide variety of facilities for use at a workstation, including security devices, electrical power, signal and/or communications, HVAC, water and other fluids, and other similar resources. The ability to provide the worker with ready access to all of these utilities is clearly advantageous in the quest to promote worker well being and effectiveness.

The efficient use of building floor space is also an ever growing concern, particularly as building costs continue to escalate. Open office plans have been developed to reduce overall officing costs, and generally incorporate large, open floor spaces in buildings that are equipped with modular furniture systems which are readily reconfigurable to accommodate the ever changing needs of a specified user, as well as the divergent requirements of different tenants. One arrangement commonly used for furnishing open plans includes movable partition panels that are detachably interconnected to partition off the open spaces into individual workstation and/or offices. Such partition panels are configured to receive hang-on furniture units, such as worksurfaces, overhead cabinets, shelves, etc., and are generally known in the office furniture industry as "systems furniture". Another arrangement for dividing and/or partitioning open plans includes modular furniture arrangements, in which a plurality of differently shaped, freestanding furniture units are positioned in a side-by-side relationship, with upstanding privacy screens attached to at least some of the furniture units to create individual, distinct workstations and/or offices. Both of these types of modular furniture systems, as well as others, have been widely received due largely to their ability to be readily reconfigured and/or moved to a new site, since they are not part of a permanent leasehold improvement.

In order to gain increased efficiency in the use of expensive office real estate, attempts are now being made to try to support high paid knowledge workers with these types of modular furniture systems in open office settings, instead of conventional private offices. However, in order to insure peak efficiency of such knowledge workers, the workstations must be equipped with the various state-of-the-art utilities and facilities discussed above. Since such workstations must be readily reconfigurable to effectively meet the ever changing needs of the user, the distribution and control of utilities throughout a comprehensive open office plan has emerged as a major challenge to the office furniture industry.

At present, some types of modular furniture systems, such as selected portable partition panels and freestanding furniture units can be equipped with an optional powerway, which extends along the entire width of the unit, and has quick-disconnect connectors adjacent opposite ends thereof to connect with adjacent, like powerways, and thereby provide electrical power to an associated furniture group or cluster. Outlet receptacles are provided along each powerway into which electrical appliances can be plugged. Cable troughs or channels are also provided in most such furniture units, so as to form a system of interconnected raceways into which signal and communications wires can be routed. Such cabling is normally routed through the furniture system after the furniture units are installed, and is then hard wired at each of the desired outlets. While this type of distribution system has proven somewhat effective, the types of utilities provided are rather limited, and their distribution is not wholly modular, thereby resulting in higher installation and reconfiguration costs. The inherent nature of modular furniture systems, which permits them to be readily reconfigured into different arrangements, makes it very difficult to achieve adequate utility distribution.

It is generally known to use a false floor construction to provide a space for routing utilities in an office complex. It is also known that certain sensitive utilities such as data lines and "clean" power source lines must be separated from other "unclean" lines such as general power source lines to prevent cross-contamination and interference. However, existing known floor constructions do not adequately provide for shielding, segregation and separation while also providing adequate flexibility of cable routing, ingress and egress. Further, many flooring constructions are expensive and/or cannot be adequately rigidly interconnected to form as solid of a floor as desired. One way of compensating for this is by increasing the bulk of the flooring, however this can be expensive and costly. Further, it is desirable to provide a floor construction having a minimum of thickness so that the system does not unnecessarily use up vertical space, which vertical space is particularly important in buildings having a low ceiling height. Still further, modularity is desired so that the floor construction can be mass produced for minimum cost, and yet installed in custom arrangements on site.

SUMMARY OF THE INVENTION

One aspect of the present invention is to provide a utility floor construction including a plurality of base tiles shaped to be abuttingly supported on a floor surface in a side-by-side configuration, and having pedestals upstanding therefrom at a preselected height; and a plurality of rigid floor tiles supported on the pedestals in a side-by-side configuration. The base tiles and the floor tiles define a generally closed cavity therebetween for routing multiple utilities therethrough. A plurality of separator channels are also provided, the separator channels being shaped to be positioned in the cavity. Each separator channel has an inverted generally U-shaped configuration with opposing vertical flanges shaped to be received between adjacent pedestals, and a horizontal web positioned at a height substantially less than the height of the pedestals. This arrangement allows a first utility to be laid onto the base tiles and routed between a first series of the pedestals to define a first raceway, and a second utility to be laid onto the base tiles and routed between a second series of the pedestals to define a second raceway. The separator channels are positioned end-to-end over one of the first and second utilities to physically separate the first and second raceways from one another.

These and other features and advantages of the present invention will be further understood and appreciated by those skilled in the art by reference to the following specification, claims and appended drawings.

BRIEF DESCRIPTION OF THE DRAWINGS

FIGS. 8A–10A are orthogonal views of the end-of-run separator shown in FIG. 7A.

DETAILED DESCRIPTION OF THE PREFERRED EMBODIMENT

Figure 1:
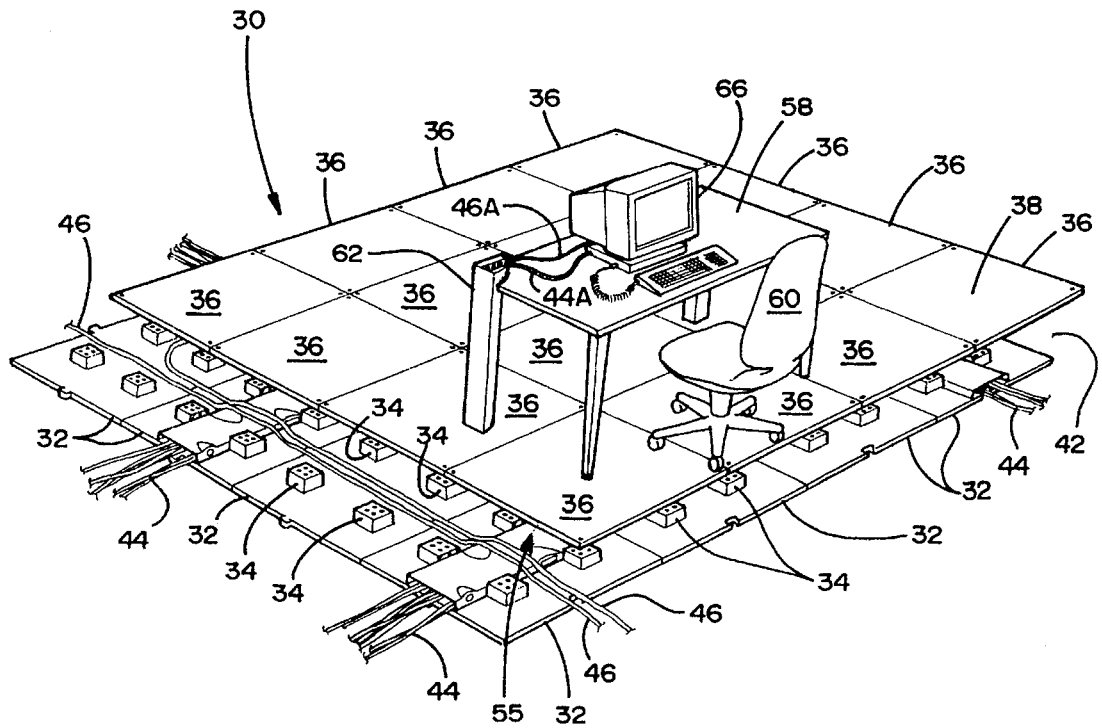
FIG. 1 is a perspective view of a floor construction embodying the present invention with several floor tiles having been removed to uncover base tiles, separator channels and utility cables located thereunder.

A utility floor construction 30 (FIG. 1) embodying the present invention includes a plurality of base tiles 32 with integral upstanding pedestals 34. A plurality of floor tiles 36 are interconnectable to pedestals 34 to form a raised floor surface 38 over base tiles 32 with a space or cavity 42 defined therebetween. Cavity 42 is adapted to receive different types of wires, cables and other utilities such as "noise-generating" electrical power wires 44 and also "noise-sensitive" communication and electronic data processing cabling 46. A plurality of differently shaped separator channels 48–52 (FIG. 2) are arrangeable in cavity 42 to define a branched or interior raceway 54. By configuring raceway 54 as required to segregate, separate and shield wires 44 from cabling 46, wires 44 are totally separated from cabling 46 so that cabling 46 does not pick up interference and "noise" from wires 44. Thus, both electrical power and communication cabling can be routed to a workstation without fear of interference therebetween and without special interference protective coverings being required around each wire.

As is well known to those skilled in the art, the routing of electrical wires in office furniture systems is typically regulated by national and/or local standards or codes, which are especially prevalent in the United States. Such codes, and other similar regulations, normally require that certain types of utilities, particularly electrical power conduits, be isolated for safety purposes. Hence, the ability of utility floor construction 30 to effectively isolate power wires 44 is an important advantage of the present invention.

Wires 44 and cabling 46 are extended to a workstation such is represented in FIG. 1 by a desk 58 and chair 60. Desk 58 includes a hollow leg or post 62 with a passageway defined therein for housing the extension wires 44A and cabling 46A that extend from a hole 64 in a floor tile 36 (FIG. 3) to a computer 66 on worksurface of desk 58. Notably it is contemplated that a variety of different furniture arrangements can be used to safely communicate wires from raised floor surface 40 to the worksurface of desk 58, and the above described illustration is one example of same.

Figure 2:
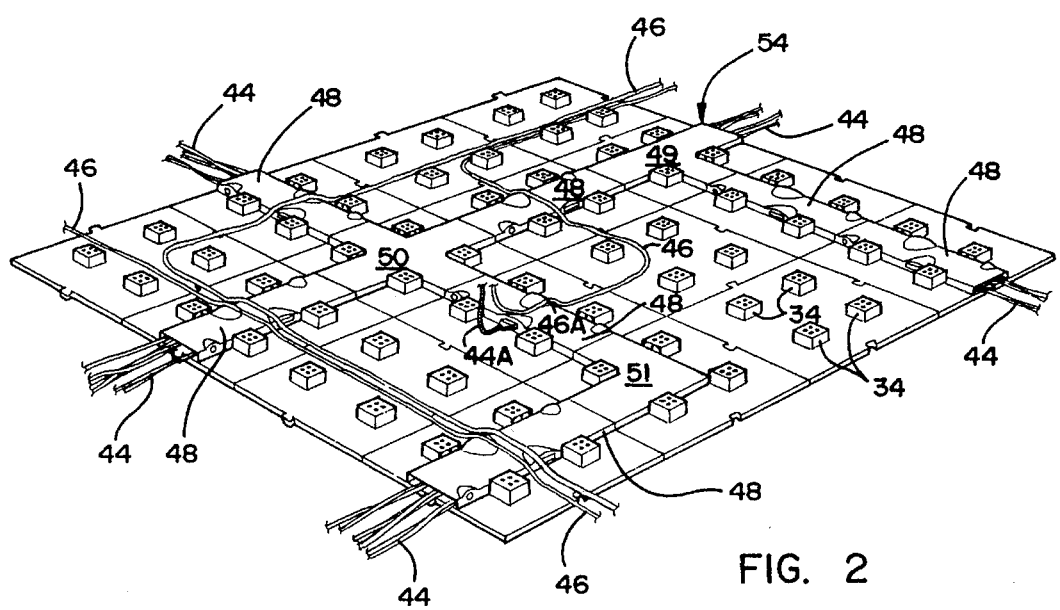
FIG. 2 is a perspective view of the floor construction shown in FIG. 1, wherein all floor tiles having been removed to show an exemplary arrangement of base tiles and separator channels, which separator channels are arranged to form a shielded raceway for a first set of wires and cables so that a second set of cables can be routed as desired without fear of interference.
Figure 3:
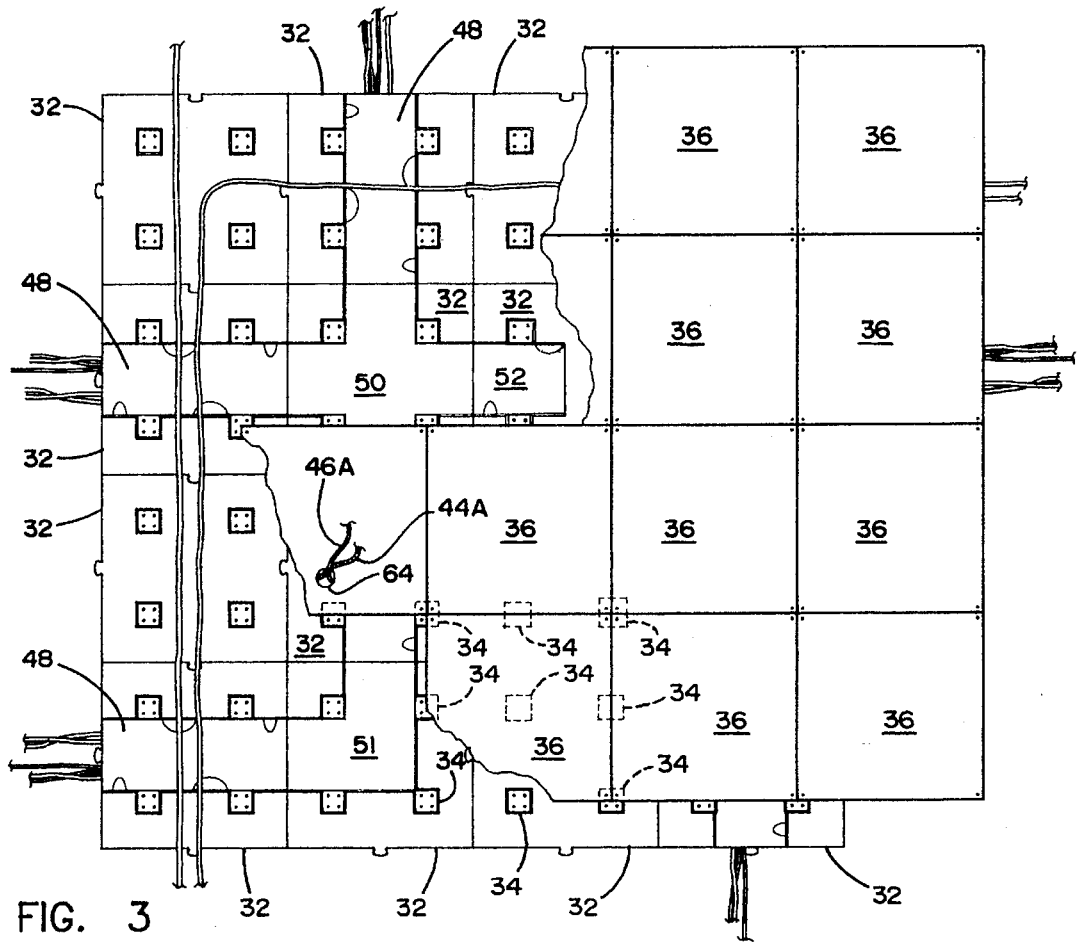
FIG. 3 is a plan view of the floor construction shown in FIG. 1, wherein several of the floor tiles removed or broken away.

In FIG. 2, the floor tiles 36 have been removed to fully expose branched raceway 54. As can be seen, raceway 54 includes a number of separator channels including, in plan view, an in-line or straight separator channel 48, a T-shaped separator channel 49, an X-shaped separator channel 50, an L-shaped separator channel 51, and an end-of-run separator channel 52 (FIG. 3). Each of separator channels 48–51 is configured to mateably fit between pedestals 34 with the open ends of separator channels 48–51 lying proximate the edges of base tiles 32. Thus, the ends of the separator channels 48–51 abut so as to form a substantially continuous and uninterrupted covering over power wires 44 when base tiles 32 are interconnected. End-of-run separator channels 52 serve to close off an end of an associated raceway, as described below. By selecting particular separator channels 48–52, they are arrangeable to cover a main branch of power wires 44 routed through cavity 42, and also cover various auxiliary branches extending from the main branch.

Figure 4:
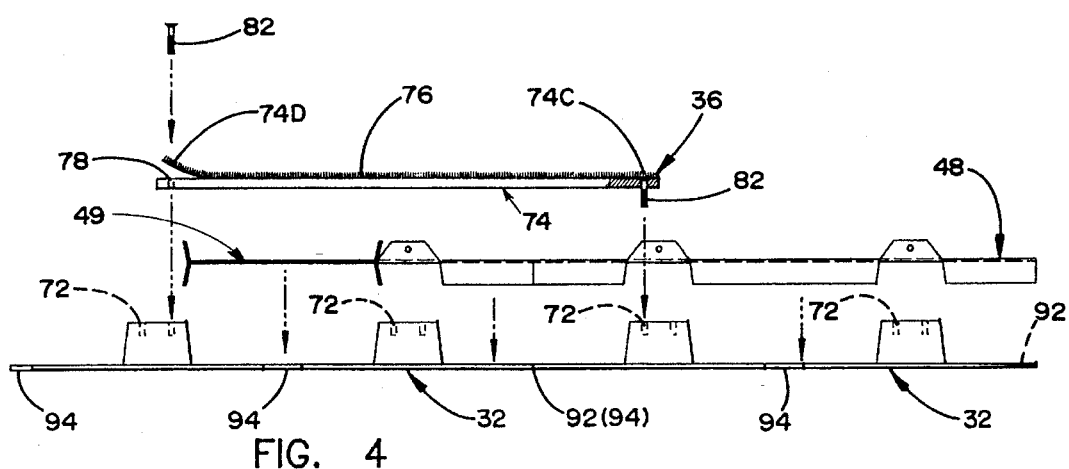
FIG. 4 is an exploded side view of the floor construction showing a floor tile, two interconnected base tiles, and an L-shaped and an in-line separator channel positioned therebetween.
Figure 5:
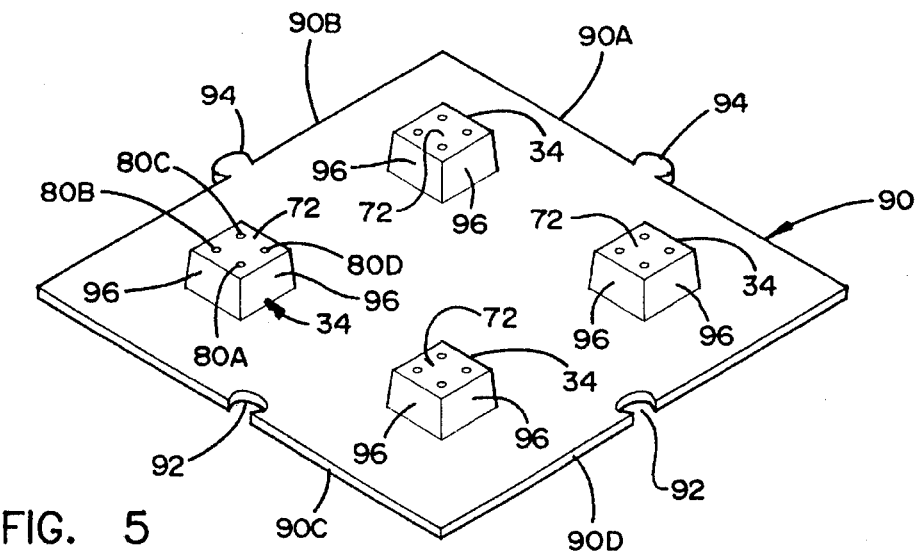
FIG. 5 is a perspective view of a base tile.

Floor tiles 36 (FIGS. 3 and 4) are attachable to the upper surface of pedestals 34. Floor tiles 36 and base tiles 32 create a sandwich-like arrangement with separator channels 48–52 located therebetween. Pedestals 34 are arranged on base tiles 32 so that the upper surfaces 72 of pedestals 34 form an array of equally spaced apart support surfaces for supporting interconnected base tiles 32 (FIGS. 4 and 5). The distance from the center of one pedestal to the next is equal to half the width of a floor tile 36 for the reasons noted below.

Figure 6:
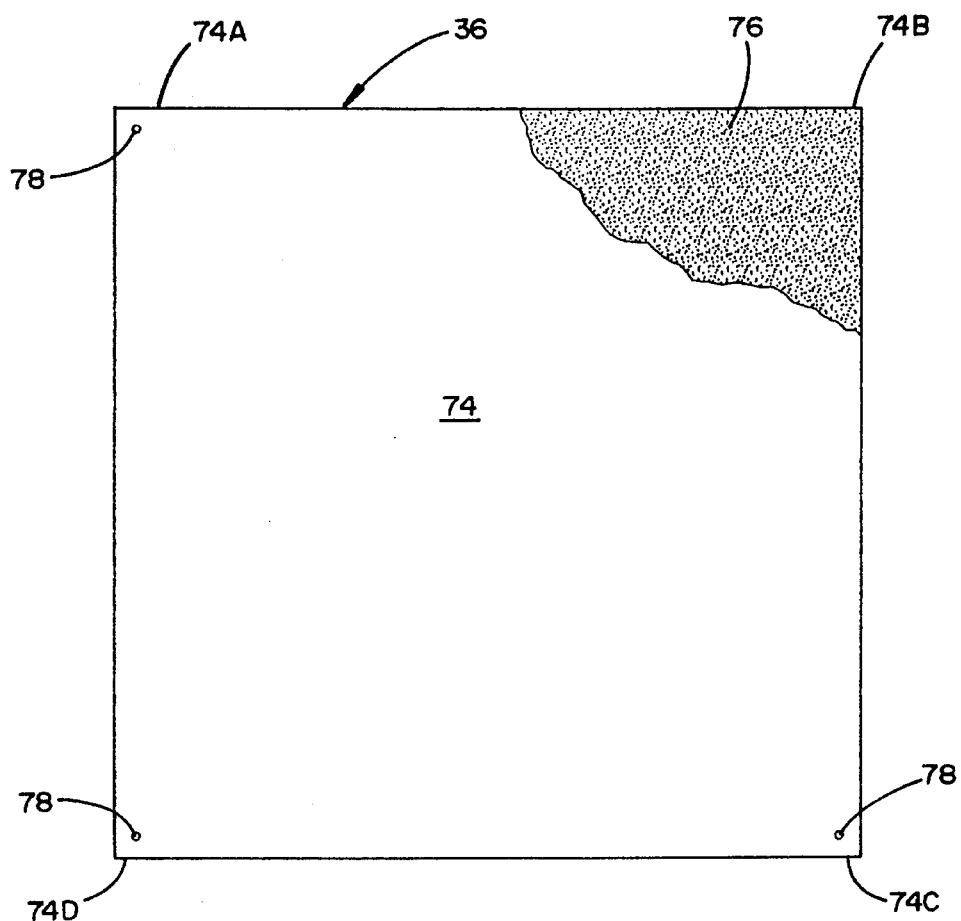
FIG. 6 is a plan view of a floor tile with the carpeting broken partially away.
Figure 7:
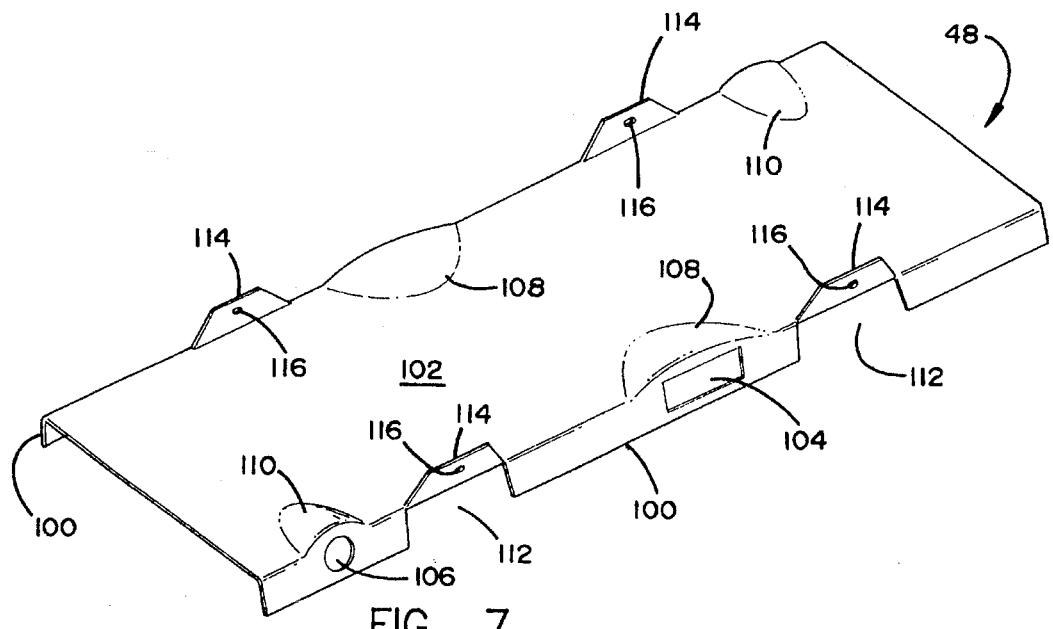
FIG. 7 is a perspective view of an in-line separator channel.
Figure 8:
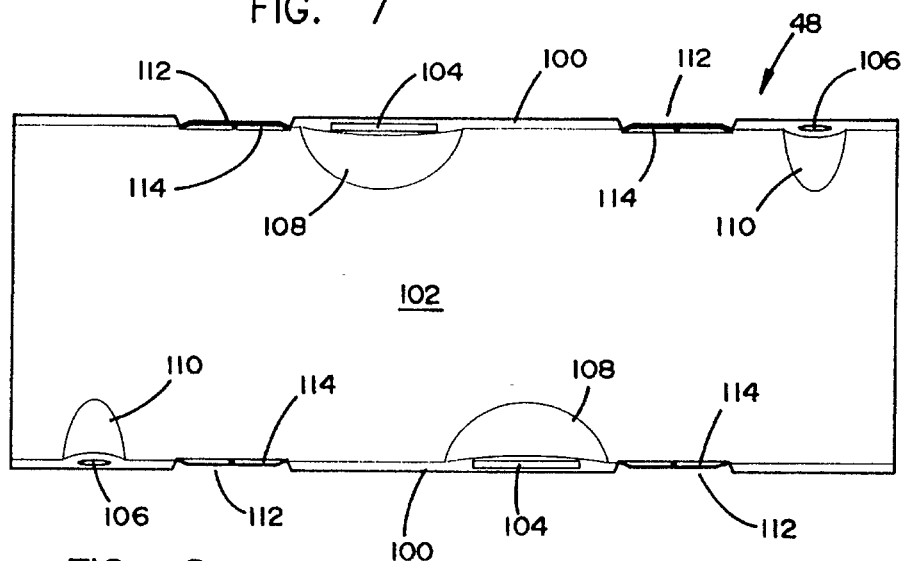
FIGS. 8–10 are orthogonal views of the in-line separator channel shown in FIG. 7.
Figure 9:
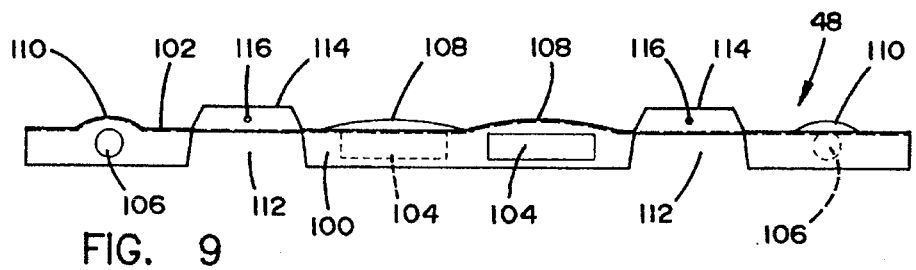
Figure 10:
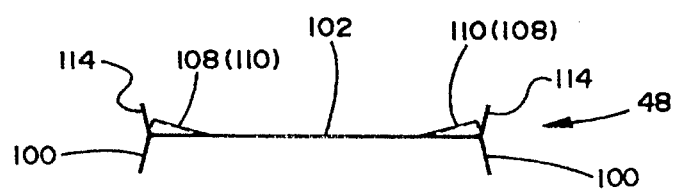
Figure 7A:
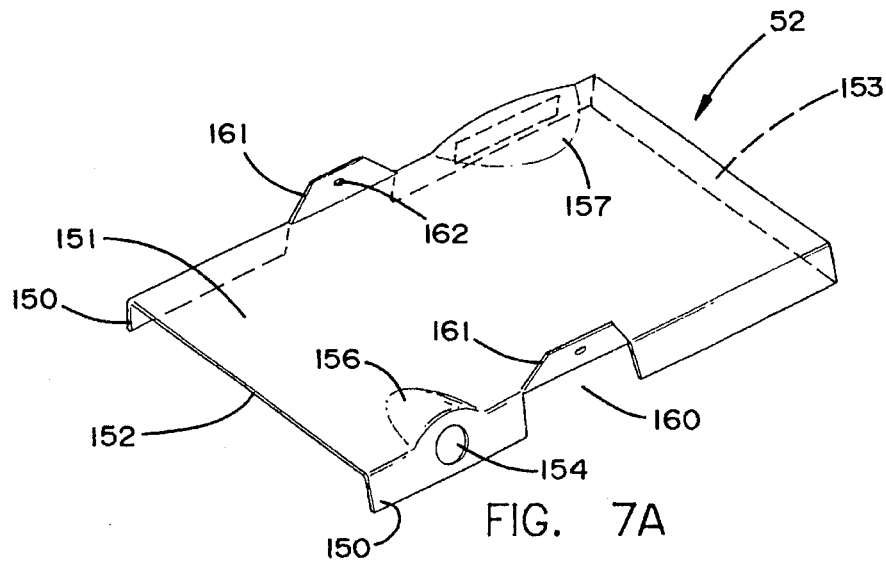
FIG. 7A is a perspective view of an end-of-run separator.
Figure 8A:
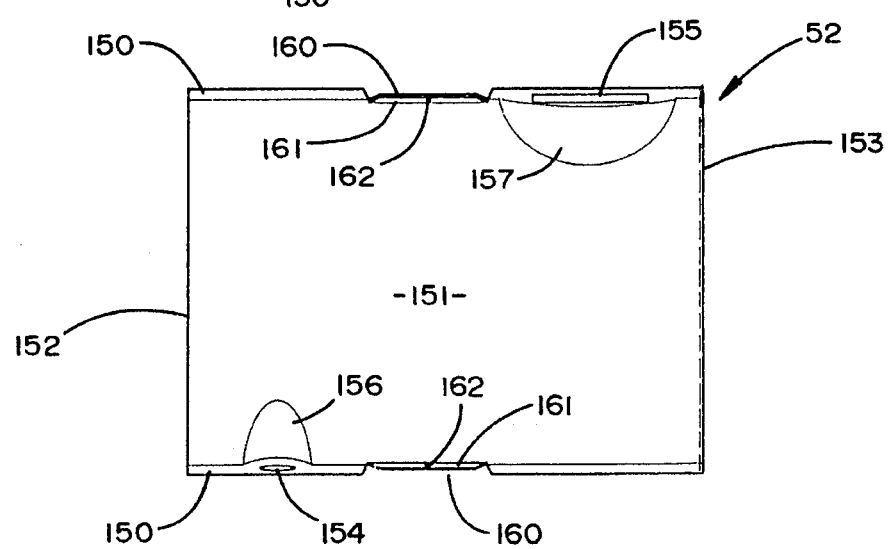
Figure 9A:
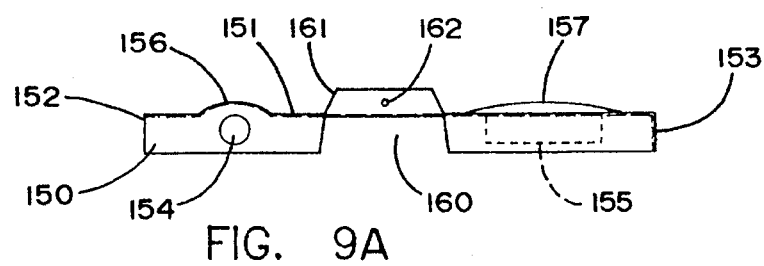
Figure 10A:
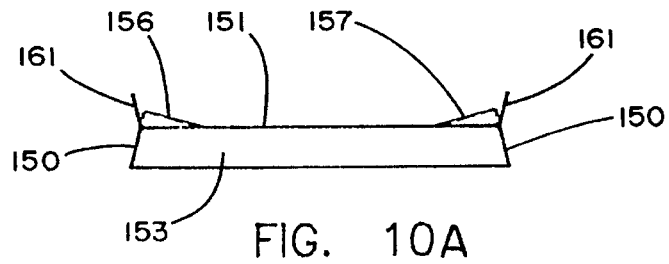
Figure 11:
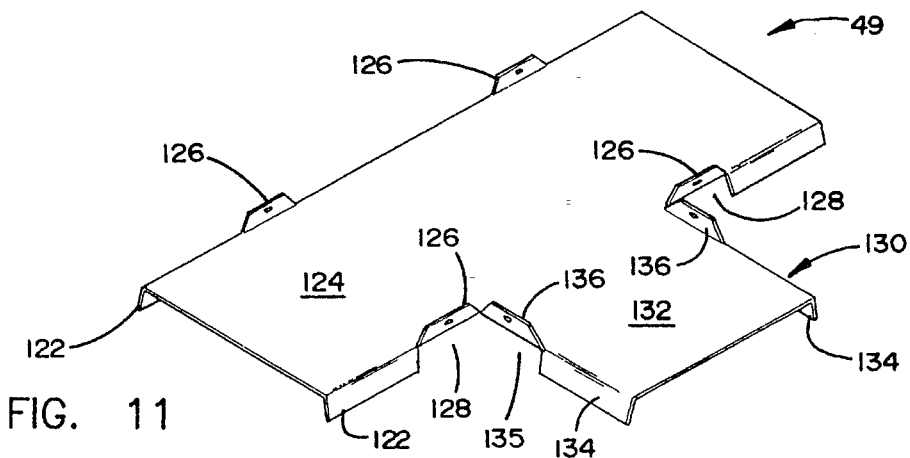
FIG. 11 is a perspective view of a T-shaped separator channel.
Figure 12:
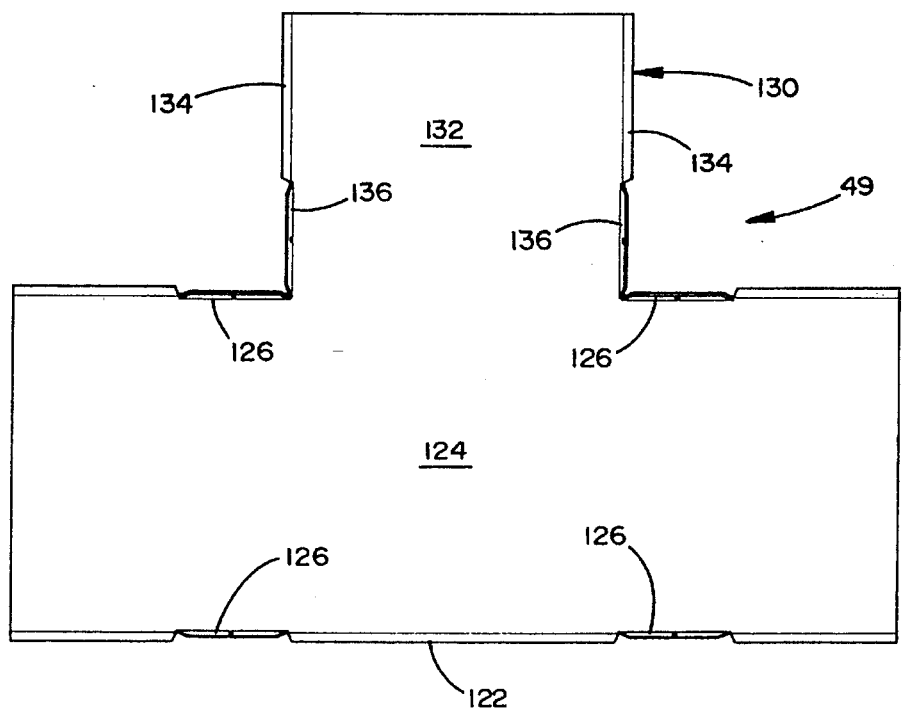
FIGS. 12–14 are orthogonal views of the T-shaped separator channel shown in FIG. 11.
Figure 13:
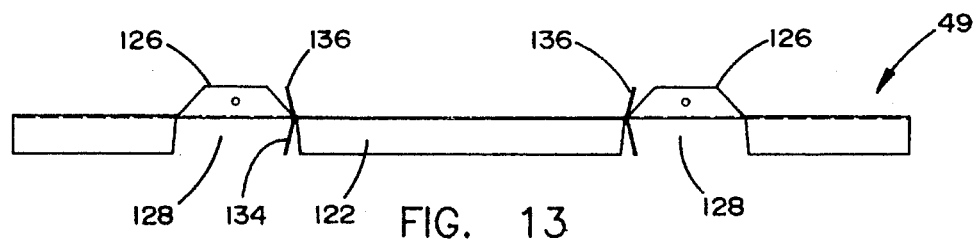
Figure 14:
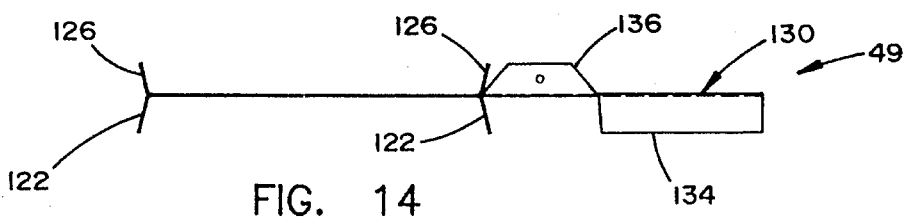

Floor tiles 36 (FIGS. 4 and 6) include a square structural plate 74 and an aesthetic covering such as carpeting 76. The corners 74A, 74B, 74C and 74D of plate 74 each include a hole 78 and pedestal upper surfaces 72 each include mating holes 80A–80D for receiving screws 82 to secure floor tiles 32 to base tile pedestals 34. The corners of carpeting 76 can then be adhered to corners 74A–D to aesthetically cover screws 82 (or the corners can be allowed to lay naturally flat). Notably, floor tiles 36 are the same size in plan view as base tiles 32. However, when floor tiles 36 are assembled to base tiles 32, floor tiles 36 are offset diagonally so that the corners of four adjacent floor tiles 36 rest on a given pedestal 34 of a given base plate 32. Two of the other pedestals 34 on the given base plate 32 support adjacent edges of a pair of floor tiles 36 and the last pedestal 34 (the one diagonally opposite the first mentioned pedestal) on the given based plate 32 supports the center of one floor tile. As best shown in FIG. 3, this arrangement results in each floor tile 36 being supported by nine pedestals 34 located on four different base tiles 32.

Each base tile 32 (FIG. 5) includes a square, planar bottom plate 90 with four edges 90A–D. The two adjacent edges 90C and 90D include keyhole slots 92 centrally located along their length, and the other two adjacent edges 90A and 90B include keyhole tabs 94 for interlockingly engaging keyhole slots 92 in an adjacent base tile 32. A pedestal 34 is centrally located in each quadrant of bottom plate 90 and protrudes upwardly a predetermined distance. Each pedestal 34 includes the upper surface 72 with the four holes 80 therein, and further includes inwardly tapered side surfaces 96.

In-line separator channel 48 (FIGS. 7–10) has an inverted U-shaped configuration with opposing vertical flanges 100 shaped to be received between adjacent pedestals 34, and a horizontal web 102 positioned at a height substantially less than the height of the pedestals 34, which height is shown as being about half that of pedestals 34. The length of in-line separator channel 48 is equal to the length of base tile 32, and each end of separator channel 48 is open. Flanges 100 include knock-out plugs 104 and 106 which can be knocked-out for form openings or windows through which utilities can be routed. Web 102 includes vertically enlarged dome-shaped extensions 108 and 110 adjacent their opposite edges, positioned vertically above and in alignment with knock-out plugs 104 and 106, respectively, to facilitate routing utilities through the openings when the knock-out plugs 104 and 106 are removed.

Figure 22:
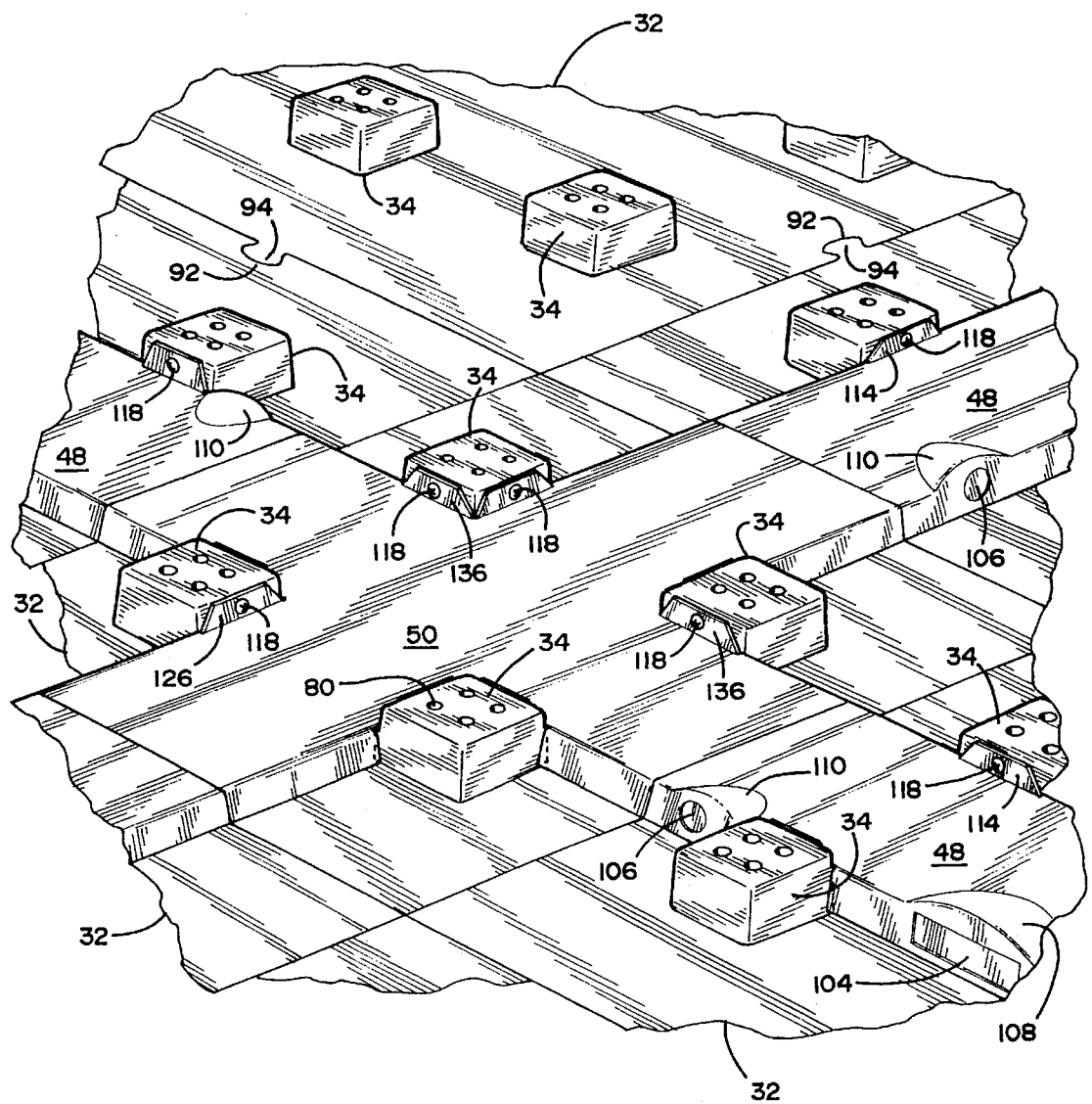
FIG. 22 is an enlarged perspective view of a raceway formed by an arrangement of an X-shaped separator channel and multiple in-line separator channels installed on an arrangement of base tiles.

The flanges 100 (FIG. 10) of in-line separator channel 48 are tapered outwardly as they extend downwardly from web 102. A pair of cutouts or notches 112 are located along flanges 100 at positions corresponding to the locations of pedestals 34. Since web 102 extends substantially fully between pedestals 34 and flanges 100 taper outwardly, pedestals 34 are received in notches 112 and positively locate separator channel 48 on base tile 32. An attachment flange 114 is formed upwardly at an angle above each notch 112 so that each attachment flange 114 rests substantially flat against one of the side surfaces 96 on pedestal 34. A hole 116 in attachment flange 114 permits secure attachment of flange 114 to pedestal 34 by a fastener or screw 118 (FIG. 22).

T-shaped separator channel 49 (FIGS. 11–14) has an inverted U-shaped configuration with flanges 122, web 124 and attachment flanges 126 with notches 128 therein comparable to the webs, flanges, and notches in in-line separator connector 48. T-shaped separator channel 49 includes a leg 130 that extends perpendicularly from the central area of the main body of T-shaped separator connector 49.

Leg 130 has a U-shaped configuration defined by web 132 and spaced apart downwardly extending angled flanges 134. Webs 132 and 124 join to form a planar T shape. Notches 135 and upwardly extending attachment flanges 136 are formed at locations where pedestals 34 are to be located. Specifically, attachment flanges 136 are formed adjacent attachment flanges 126 and at 90° therefrom at the corners formed by the joinder of leg 130 to the main body of T-shaped connector 49. The outer end of leg 130 is open, as are both ends of the main body of T-shaped separator channel 49, and thus wires or cabling can be routed into and through separator channel 49 in any of three directions. Notably, leg 130 extends to the edge of base tile 32 so that any wires or cabling placed thereunder are fully shielded.

Figure 15:
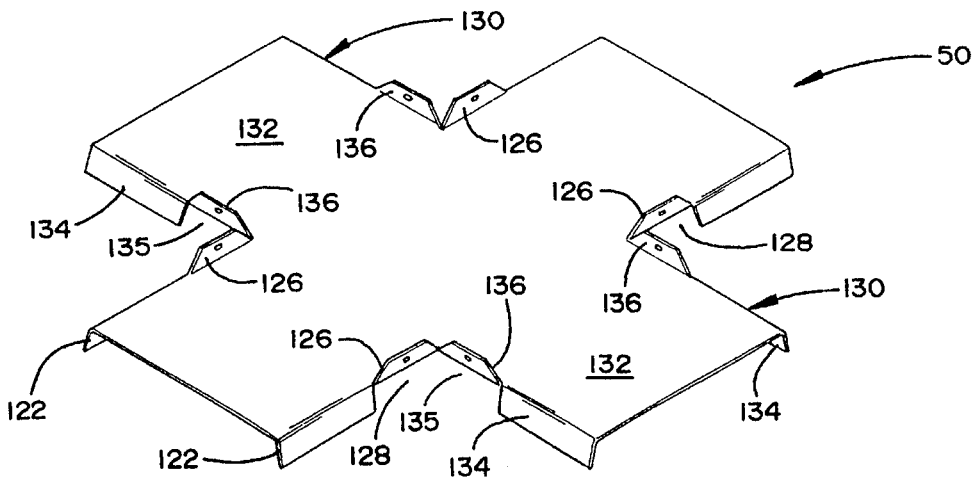
FIG. 15 is a perspective view of an X-shaped separator channel.
Figure 16:
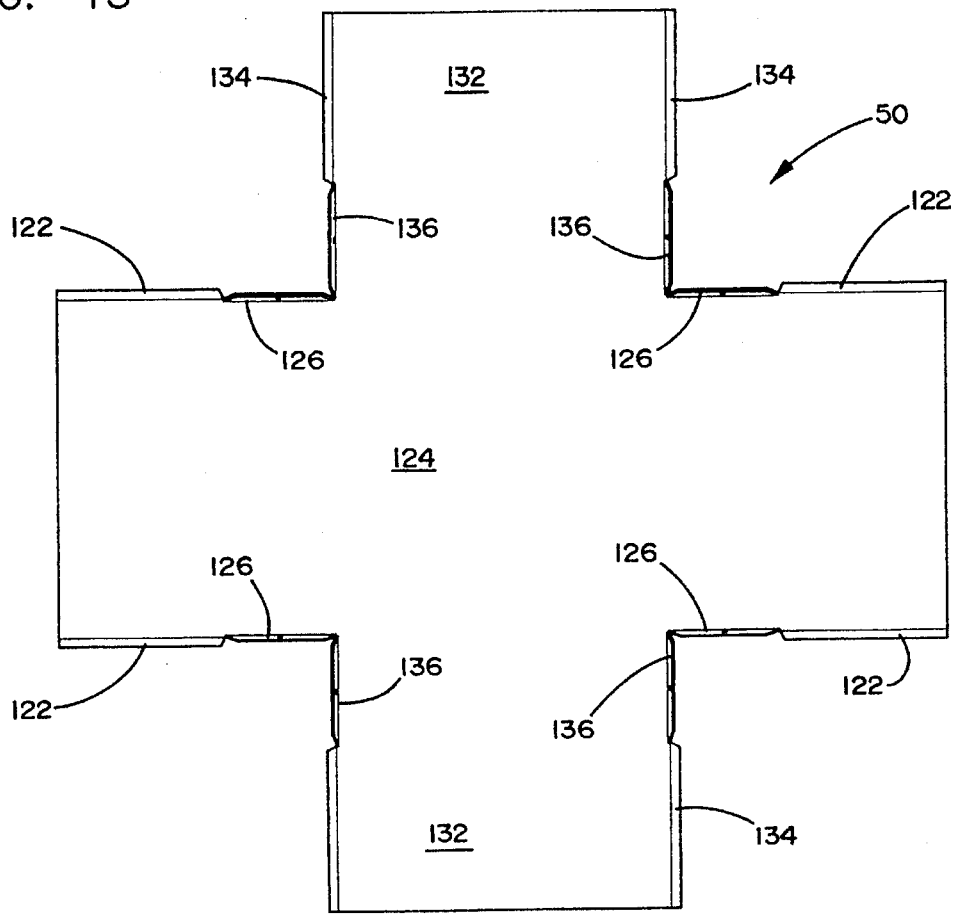
FIGS. 16–17 are orthogonal views of the X-shaped separator channel shown in FIG. 15.
Figure 17:
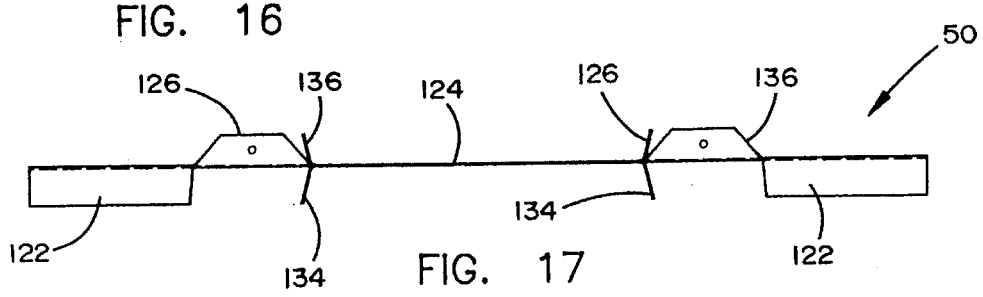
Figure 18:
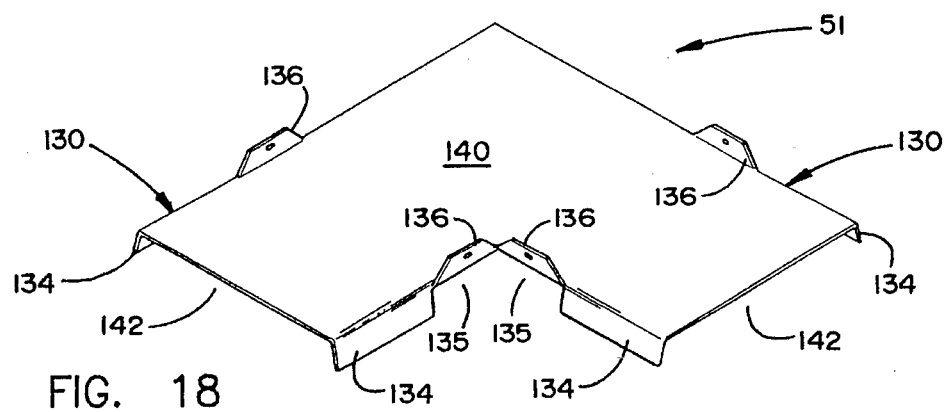
FIG. 18 is a perspective view of an L-shaped separator channel.
Figure 19:
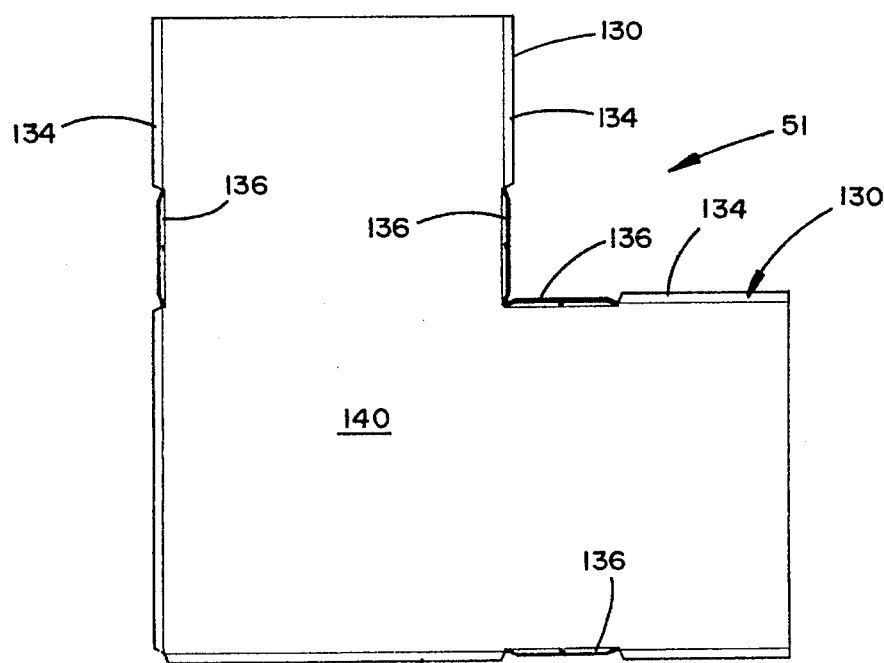
FIGS. 19–21 are orthogonal views of the L-shaped separator channel shown in FIG. 18.
Figure 20:
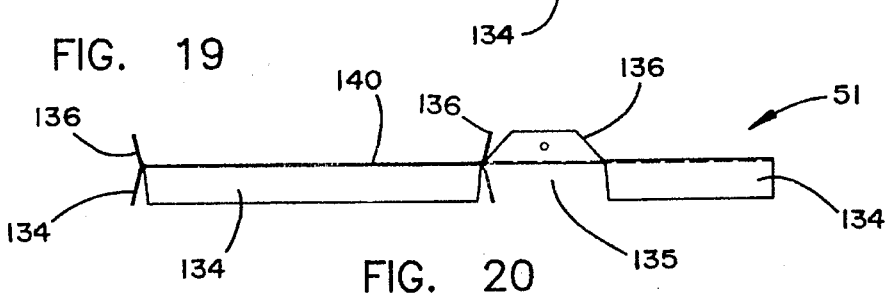
Figure 21:
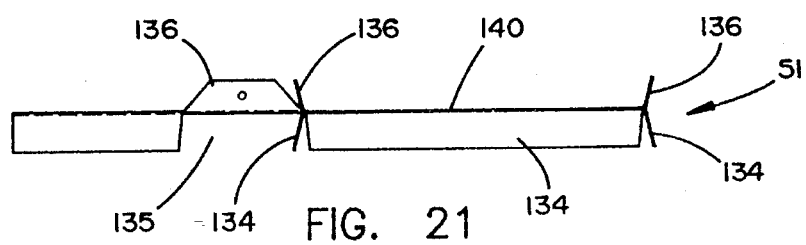

X-shaped separator channel 50 (FIGS. 15–17) has an inverted U-shaped configuration which is identical to T-shaped separator channel 49, with the exception that X-shaped separator channel 50 has two opposing laterally extending legs 130. Based on the previous descriptions of separator channels 48 and 49, the description of X-shaped separator channel 50 need not be further described in detail since the description would be largely repetitive, except to note that wires and cabling can be routed in any of four directions under X-shaped separator channel 50. Notably, the four ends of X-shaped separator channel 50 define distances so that they terminate proximate the edges of a given base tile 32 on which the channel is installed.

L-shaped separator channel 51 (FIGS. 18–21) has an inverted U-shaped configuration which is in effect two legs 130 joined at a 90° angle. A planar L-shaped web 140 defines two ends 142 that can be positioned along adjacent edges of a base tile 32. Downwardly extending flanges 134 enclose the area under web 140 except at the open ends of L-shaped separator channel 51. Four notches 135 are formed in flanges 134 for receiving pedestals 34, and attachment flanges 136 extend upwardly above notches 135 for attaching to the pedestals 34 positioned in notches 135.

It is to be understood that T-shaped separator channels 49, L-shaped separator channels 51 and X-shaped separator channels 50 may also include knock-out plugs and dome-shaped extensions (not shown) similar to in-line separator channels 48.

End-of-run separator channel 52 (FIGS. 7A–10A) is somewhat similar in construction to in-line separator channel 52, and has an inverted U-shaped configuration with opposing vertical flanges 150 shaped to be received between adjacent pedestals 34, and a horizontal web 151 positioned at a height substantially less than the height of the pedestals 34, which height is shown as being about half that of pedestals 34. The length of end-of-run separator channel 52 is equal to approximately one-half of the length of base tile 32, and one end 152 of separator channel 52 is open, and the opposite end 153 is closed. Flanges 150 include knock-out plugs 154 and 155 which can be knocked-out for form openings or windows through which utilities can be routed. Web 151 includes vertically enlarged dome-shaped extensions 156 and 157 adjacent their opposite edges, positioned vertically above and in alignment with knock-out plugs 154 and 155, respectively to facilitate routing utilities through the openings when the knock-out plugs 154 and 155 are removed.

The flanges 150 (FIG. 104) of end-of-run separator channel 52 are tapered outwardly as they extend downwardly from web 151. Two cutouts or notches 160 are located along flanges 150 at positions corresponding to the locations of pedestals 34. Since web 150 extends substantially fully between pedestals 34 and flanges 150 taper outwardly, pedestals 34 are received in notches 160 and positively locate end-of-run separator channel 52 on base tile 32. An attachment flange 161 is formed upwardly at an angle above each notch 160 so that each attachment flange 161 rests substantially flat against one of the side surfaces 96 on pedestal 34. A hole 162 in attachment flange 161 permits secure attachment of flange 161 to pedestal 34 by a fastener or screw 118 (FIG. 22).

FIG. 22 illustrates a plurality of base tiles 32 positioned adjacently with keyhole tabs 94 on each base tile lockingly engaging keyhole slots 92 in the adjacent base tile. Also shown is an X-shaped separator channel 50 secured by screws 118 to pedestals 34 of a base tile 32. Still further, several in-line separator channels 48 are illustrated, the in-line separator channels 48 being shown as secured to adjacent base tiles 32 with the ends of the in-line separator channels 48 abutting the ends of the X-shaped separator channel 50 so that wires and cabling can be extended therethrough in a shielded condition.

In operation, floor construction 30 is constructed in the following manner. Base tiles 32 are selected and arranged on a building floor surface, or another similar support area, with their adjacent edges interconnected by interlocking tabs 94 and slots 92. A first set of utility conduits, such as the illustrated power wires 44, are laid onto selected base tiles 32, and routed between their associated pedestals 34 to define a portion of the interior raceway 54, which extends uninterrupted through floor construction 30 in a predetermined pattern to supply electrical power to each of the designated workstations, such as at desk 58. Separator channels 48–52 are then positioned over power wires 44 to fully enclose interior raceway 54. An end-of-run separator channel 52 is used at each end of a branch or leg of interior raceway 54, and selected knock-out plugs on the separator channels 48–52 are removed as required to access power wires 44. A second set of utility conduits, such as the illustrated signal cables 46, are then laid onto a second set of selected base tiles 32, and similarly routed between their associated pedestals 34 to define a portion of a second raceway 55, which also extends uninterrupted through floor construction 30 in a predetermined pattern to supply signal and/or communications to each of the designated workstations, such as at desk 58. Where cable raceway 55 intersects power raceway 54, the signal cables 46 are simply draped over the adjacent ones of the separator channels 48–52, which serve to maintain physical separation from power wires 44. Floor tiles 36 are next mounted on top of the pedestals 34 of base tiles 32 to fully enclose floor cavity 42, as well as cable raceway 55.

Thus, a utility floor construction is provided including a plurality of interconnectable base tiles for resting on a floor surface, each base tile having upstanding pedestals, and including a plurality of floor tiles supported by and attached to the pedestals to create a raised floor surface and a cavity thereunder. A plurality of differently shaped separator channels are positionable in the cavity and attachable to the pedestals to create a custom raceway, the separator channels being configured to segregate and shield wires, cables and utilities from other wires, cables and utilities that are sensitive to noise and interference from the first mentioned wires, cables and utilities. The separator channels are also configured to facilitate wire, cable and utility routing, ingress and egress.

In the foregoing description, it will be readily appreciated by those skilled in the art that modifications may be made to the disclose embodiments without departing from the inventive concepts disclosed herein. Such modifications are to be considered as included in the following claims, unless these claims by their language expressly state otherwise.

The embodiments of the invention in which an exclusive property or privilege is claimed are defined as follows:

1. A utility floor construction, comprising:

a plurality of base tiles shaped to be abuttingly supported on a floor surface in a side-by-side configuration, and having pedestals upstanding therefrom at a preselected height;

a plurality of rigid floor tiles supported on said pedestals in a side-by-side configuration, and defining a generally closed cavity between said base tiles and said floor tiles to route multiple utilities therethrough;

a plurality of separator channels, each having an inverted generally U-shaped closed configuration with open ends, opposing vertical flanges shaped to be received between adjacent pedestals, and a horizontal web positioned at a height substantially less than the height of said pedestals; said separator channels being positioned end-to-end on said base tiles between said pedestals to form a continuous enclosed raceway channel that divides said cavity into first and second raceways which are physically isolated from one another, whereby a first utility is laid onto said base tiles and routed between a first series of said pedestals to define said first raceway, a second utility is laid onto said base tiles and routed between a second series of said pedestals to define said second raceway, and said separator channels are positioned end-to-end over one of said first and second utilities to physically separate said first and second utilities from one another.

2. A utility floor as set forth in claim 1, wherein:

said base tiles include mating keyhole shaped tabs and slots arranged along opposite edges thereof to securely yet detachably interconnect the same.

3. A utility floor as set forth in claim 2, wherein:

said floor tiles are shaped to span between at least two adjacent ones of said base tiles.

4. A utility floor as set forth in claim 3, wherein:

said separator channels include knock-out plugs in their opposing vertical flanges to selectively form openings through which utilities can be routed.

5. A utility floor as set forth in claim 4, wherein:

said separator channels include vertically enlarged, dome-shaped extensions adjacent opposite edges of their horizontal webs, positioned in vertical alignment with said knock-out plugs to facilitate routing utilities through said openings.

6. A utility floor as set forth in claim 5, wherein:

at least one of said separator channels has an L-shaped plan configuration, and an inverted generally U-shaped lateral cross-sectional shape similar to that of said separator channel.

7. A utility floor as set forth in claim 6, wherein:

at least one of said separator channels has a T-shaped plan configuration, and an inverted generally U-shaped lateral cross-sectional shape similar to that of said separator channel.

8. A utility floor as set forth in claim 7, wherein:

at least one of said separator channels has an X-shaped plan configuration, and an inverted generally U-shaped lateral cross-sectional shape similar to that of said separator channel.

9. A utility floor as set forth in claim 8, wherein:

said separator channels include an end-of-run separator channel having an inverted generally U-shaped lateral cross-sectional shape similar to that of said separator channel, and a closed end.

10. A utility floor as set forth in claim 9, wherein:

said base tiles each has a generally rectangular plan shape.

11. A utility floor as set forth in claim 10, wherein:

said base tiles each has at least four of said pedestals positioned adjacent opposite corners thereof.

12. A utility floor as set forth in claim 11, wherein:

said base tiles each has first and second lateral dimensions; and said separator channels have a length substantially commensurate with at least one of the first and second lateral dimensions of said base tiles.

13. A utility floor as set forth in claim 12, wherein:

said floor tiles each has a generally rectangular plan shape configured to be supported by at least four of said pedestals.

14. A utility floor as set forth in claim 13, wherein:

said floor tiles are configured such that each is supported on at least nine of said pedestals.

15. A utility floor as set forth in claim 14, including:

fasteners detachably connecting said floor tiles to said pedestals.

16. A utility floor as set forth in claim 15, wherein:

said pedestals have a side elevational configuration which tapers inwardly toward said floor tiles.

17. A utility floor as set forth in claim 16, wherein:

said separator channel flanges each has a pair of notches therethrough in which a pair of associated pedestals are received to positively locate said separator channels on said base tiles.

18. A utility floor as set forth in claim 17, wherein:

said separator channel web is configured to divide an associated portion of said cavity into two vertically stacked spaces for physically separating the utilities from one located inside said first and second raceways another where they intersect.

19. A utility floor as set forth in claim 1, wherein:

said separator channels include knock-out plugs in their opposing vertical flanges to selectively form openings through which utilities can be routed.

20. A utility floor as set forth in claim 19, wherein:

said separator channels include vertically enlarged, dome-shaped extensions adjacent opposite edges of their horizontal webs, positioned in vertical alignment with said knock-out plugs to facilitate routing utilities through said openings.

21. A utility floor as set forth in claim 1, wherein:

at least one of said separator channels has an L-shaped plan configuration, and an inverted U-shaped lateral cross-sectional shape similar to that of said separator channel;

at least one of said separator channels has a T-shaped plan configuration, and an inverted U-shaped lateral cross-sectional shape similar to that of said separator channel; and at least one of said separator channels has an X-shaped plan configuration, and an inverted U-shaped lateral cross-sectional shape similar to that of said separator channel.

22. A utility floor as set forth in claim 1, wherein:

said pedestals have a side elevational configuration which tapers inwardly toward said floor tiles; and said separator channel flanges each have a pair of notches therethrough in which a pair of associated pedestals are received to positively locate said separator channels on said base tiles.

23. A utility floor as set forth in claim 1, wherein:

said floor tiles are shaped to span between at least two adjacent ones of said base tiles.

24. A utility floor as set forth in claim 1, wherein:

said separator channels include vertically enlarged, dome-shaped extensions adjacent to opposite edges of horizontal webs.

25. A utility floor as set forth in claim 1, wherein:

at least one of said separator channels has an L-shaped plan configuration, and an inverted generally U-shaped lateral cross-sectional shape similar to that of said separator channel.

26. A utility floor as set forth in claim 1, wherein:

at least one of said separator channels has a T-shaped plan configuration, and an inverted generally U-shaped lateral cross-sectional shape similar to that of said separator channel.

27. A utility floor as set forth in claim 1, wherein:

at least one of said separator channels has an X-shaped plan configuration, and an inverted generally U-shaped lateral cross-sectional shape similar to that of said separator channel.

28. A utility floor as set forth in claim 1, wherein:

said separator channels include an end-of-run separator channel having an inverted generally U-shaped lateral cross-sectional shape similar to that of said separator channel, and a closed end.

29. A utility floor as set forth in claim 1, wherein:

said base tiles each has a generally rectangular plan shape.

30. A utility floor as set forth in claim 1, wherein:

said base tiles each has at least four of said pedestals positioned adjacent opposite corners thereof.

31. A utility floor as set forth in claim 1, wherein:

said base tiles each has first and second lateral dimensions; and said separator channels have a length substantially commensurate with at least one of the first and second lateral dimensions of said base tiles.

32. A utility floor as set forth in claim 1, wherein:

said floor tiles each has a generally rectangular plan shape configured to be supported by at least four of said pedestals.

33. A utility floor as set forth in claim 1, wherein:

said floor tiles are configured such that each is supported on at least nine of said pedestals.

34. A utility floor as set forth in claim 1, including:

fasteners detachably connecting said floor tiles to said pedestals.

35. A utility floor as set forth in claim 1, wherein:

said pedestals have a side elevational configuration which tapers inwardly toward said floor tiles.

36. A utility floor as set forth in claim 1, wherein:

said separator channels each have flanges with a pair of notches therethrough in which a pair of associated pedestals are received to positively locate said separator channels on said base tiles.

37. A utility floor as set forth in claim 1, wherein:

said separator channels are configured to divide an associated portion of said cavity into two vertically stacked spaces to physically separate the first and second utilities from one another where they intersect.

38. A utility floor construction, comprising:

a plurality of base tiles shaped to be abuttingly supported on a floor surface in a side-by-side configuration, and having pedestals upstanding therefrom at a preselected height;

a plurality of rigid floor tiles supported on said pedestals in a side-by-side configuration, and defining a generally closed cavity between said base tiles and said floor tiles to route multiple utilities therethrough;

a plurality of separator channels shaped to be positioned in said cavity, wherein each has an inverted generally U-shaped configuration with opposing vertical flanges shaped to be received between adjacent pedestals, and a horizontal web positioned at a height substantially less than the height of said pedestals, whereby a first utility is laid onto said base tiles and routed between a first series of said pedestals to define a first raceway, a second utility is laid onto said base tiles and routed between a second series of said pedestals to define a second raceway, and said separator channels are positioned end-to-end over one of said first and second utilities to physically separate said first and second raceways from one another; and wherein said separator channels include knock-out plugs in their opposing vertical flanges to selectively form openings through which utilities can be routed; and said separator channels include vertically enlarged, dome-shaped extensions adjacent opposite edges of their horizontal webs, positioned in vertical alignment with said knock-out plugs to facilitate routing utilities through said openings.

39. A utility floor construction, comprising:

at least one base tile shaped to be supported on a floor surface, and having at least three pedestals upstanding therefrom at a preselected height and in a spaced apart pattern;

at least one rigid floor tile supported on said pedestals, and defining a generally closed cavity between said base tile and said floor tile to route multiple utilities therethrough;

at least one separator channel positioned in said cavity, and having an inverted generally U-shaped configuration with opposing vertical flanges shaped to be received between adjacent pedestals, and a horizontal web positioned at a height substantially less than the height of said pedestals to physically separate different utilities from one another; and wherein said separator channel includes knock-out plugs in its opposing vertical flanges to selectively form openings through which utilities can be routed; and said separator channel includes vertically enlarged, dome-shaped extensions adjacent opposite edges of its horizontal web, positioned in vertical alignment with said knock-out plugs to facilitate routing utilities through said openings.

* * * * *

UNITED STATES PATENT AND TRADEMARK OFFICE
CERTIFICATE OF CORRECTION

PATENT NO. : 5,483,776  
DATED : January 16, 1996  
INVENTOR(S) : Robert P. Poppe Page 1 of 2

It is certified that error appears in the above-identified patent and that said Letters Patent is hereby corrected as shown below:

Column 1, line 19;
  "date" should be --data--.

Column 3, line 54;
  "." should be --;--.

Column 3, line 56;
  "." should be ";".

Column 3, line 67;
  "." should be ";".

Column 7, line 5;
  "Fig. 104" should be --Fig. 10A--.

Column 8, line 9;
  "disclose" should be --disclosed--.

Column 8, line 20;
  After "pedestals", insert --, with side edges thereof abutting each other--.

Column 8, line 21;
  After "configuration", insert --to form a continuous floor surface--.

UNITED STATES PATENT AND TRADEMARK OFFICE
CERTIFICATE OF CORRECTION

PATENT NO. : 5,483,776
DATED : January 16, 1996
INVENTOR(S) : Robert P. Poppe

It is certified that error appears in the above-indentified patent and that said Letters Patent is hereby corrected as shown below:

Column 8, line 23;
"to route" should be --for routing--.

Column 8, line 40;
"to physically separate" should be --for physically separating--.

Column 9, line 49;
Delete "another where they intersect".

Column 10, line 66;
".side" should be --side--.

Column 11, lines 9 and 10;
"to physically separate the first and second utilities from one another where they intersect" should be --for physically separating the utilities from one located inside said first and second raceways--.

Signed and Sealed this

Eighth Day of October, 1996

Attest:

BRUCE LEHMAN

Attesting Officer

Commissioner of Patents and Trademarks